United States Patent
Schmidt et al.

(10) Patent No.: US 9,610,889 B2
(45) Date of Patent: Apr. 4, 2017

(54) PROCEDURE AND STEERING MECHANISM TO CONTROL MAIN HEADLIGHTS WITH ADJUSTABLE VERTICAL CUT-OFF LINE TO REDUCE THE GLARE OF OBJECTS

(71) Applicant: HELLA KGaA, Lippstadt (DE)

(72) Inventors: Christian Schmidt, Paderborn (DE); Tobias Irmscher, Gütersloh (DE); Christian Hüster, Salzkotten (DE); Stefan Krause, Versmold (DE); Carsten Wilks, Lippstadt (DE)

(73) Assignee: Hella KgAA, Lippstadt (DE)

( * ) Notice: Subject to any disclaimer, the term of this patent is extended or adjusted under 35 U.S.C. 154(b) by 41 days.

(21) Appl. No.: 13/683,407

(22) Filed: Nov. 21, 2012

(65) Prior Publication Data

US 2013/0182448 A1 Jul. 18, 2013

(30) Foreign Application Priority Data

Nov. 22, 2011 (DE) .......................... 10 2011 055 606

(51) Int. Cl.
*B60Q 1/06* (2006.01)
*B60Q 1/14* (2006.01)

(52) U.S. Cl.
CPC .............. *B60Q 1/06* (2013.01); *B60Q 1/143* (2013.01); *B60Q 2300/056* (2013.01); *B60Q 2300/41* (2013.01); *B60Q 2300/42* (2013.01)

(58) Field of Classification Search
CPC ...... B60Q 1/00; B60Q 2200/00; B60Q 11/00; B60Q 1/143; B60Q 1/1432;

(Continued)

(56) References Cited

U.S. PATENT DOCUMENTS 6,281,632 B1 *  8/2001  Stam et al. ...................... 315/82
6,429,594 B1 *  8/2002  Stam et al. ...................... 315/82

(Continued)

FOREIGN PATENT DOCUMENTS

DE      10 2007 040 042 A1    2/2009
EP          2 119 593 A1      11/2009

OTHER PUBLICATIONS

German Search Report for Application No. 10 2011 055 606.0 dated Apr. 26, 2012.

*Primary Examiner* — Elmito Breval
*Assistant Examiner* — Arman B Fallahkhair
(74) *Attorney, Agent, or Firm* — Husch Blackwell LLP

(57) ABSTRACT

A control device for vehicle headlights with adjustable light distributions and with an adjustable vertical cutoff line in at least one light distribution,
with access to the programming of information about the location of objects located in front of the vehicle with glare needing to be reduced,
with a processing medium,
operable for generating variables to set an adjustable light distribution on at least one main headlight
and/or operable for generating variables to set a vertical cut-off line on a light distribution installed on the main right headlight and a vertical cut-off line installed on the main left headlight,
with an outlet on which variables for setting up a light distribution and/or the vertical cut -off lines can be deployed,
whereby the control device has a memory to store the light strengths of locations in front of the main headlights for the adjustable light distributions.

5 Claims, 5 Drawing Sheets

(58) Field of Classification Search
CPC .......... B60Q 2300/42; B60Q 2300/314; B60Q 2300/332; B60Q 2300/3321; B60Q 1/06; B60Q 2300/056; B60Q 2300/41
USPC .............. 362/460–468; 340/457.2, 469, 937; 701/523, 28, 49; 382/104
See application file for complete search history.

(56) References Cited

U.S. PATENT DOCUMENTS

| | | | | |
|---|---|---|---|---|
| 7,227,611 | B2* | 6/2007 | Hull ....................... | B60Q 1/085 348/E5.142 |
| 7,239,231 | B2* | 7/2007 | Tsukamoto .......... | B60Q 1/1423 315/77 |
| 7,510,310 | B2* | 3/2009 | Komatsu ................ | B60Q 1/085 362/466 |
| 7,575,348 | B2* | 8/2009 | Hasegawa .............. | B60Q 1/143 362/464 |
| 7,646,888 | B2* | 1/2010 | Tsukamoto .......... | B60Q 1/1423 348/149 |
| 7,692,535 | B2* | 4/2010 | Michiyama ................... | 340/469 |
| 7,985,010 | B2* | 7/2011 | Kamioka et al. ............. | 362/465 |
| 8,081,797 | B2* | 12/2011 | Bergeron ............. | G06K 9/2018 362/611 |
| 2004/0201483 | A1* | 10/2004 | Stam et al. ................... | 340/600 |
| 2006/0018512 | A1* | 1/2006 | Stam et al. ................... | 382/104 |
| 2013/0155704 | A1* | 6/2013 | Takagaki ..................... | 362/466 |

* cited by examiner

PROCEDURE AND STEERING MECHANISM TO CONTROL MAIN HEADLIGHTS WITH ADJUSTABLE VERTICAL CUT-OFF LINE TO REDUCE THE GLARE OF OBJECTS

CROSS REFERENCE

This application claims priority to German Patent Application No. 10 2011 055606.0, filed Nov. 22, 2011, which is expressly incorporated in its entirety by reference herein.

TECHNICAL FIELD OF THE INVENTION

The invention concerns a control device to control the main headlights of a vehicle with an adjustable light distribution and with an adjustable vertical cut-off line in at least one light distribution,
  with access to the programming of information about the location of objects located in front of the vehicle with glare needing to be reduced, in particular vehicles driving in front and/or oncoming,
  with a processing medium,
  with which, and depending on the programmed information, variables can be generated to set an adjustable light distribution on the right and/or left main headlight and/or
  with it, and depending on the programmed information, variables can be generated to set a vertical cut-off line on a light distribution installed on the main right headlight and a vertical cut-off line installed on the main left headlight,
  with an outlet on which variables for setting up a light distribution and/or the vertical cut-off lines can be deployed,

BACKGROUND OF THE INVENTION

The location of the objects in front of the vehicle needing their glare reduced can for example be described by the face angle, the angle of elevation and the distance.

The invention concerns furthermore a procedure to control the main headlights of a vehicle with adjustable light distributions and with an adjustable vertical cut-off line in at least one light distribution, by which
  information is provided about the location of objects located in front of the vehicle with glare needing to be reduced, in particular vehicles driving in front and/or oncoming,
  depending on the programmed information, variables can be generated to set an adjustable light distribution on the right and/or left main headlight and/or
  depending on the programmed information, variables can be generated to set a vertical cut-off line on a light distribution installed on the main right headlight and a vertical cut -off line installed on the main left headlight, and
  the variables for setting up the light distributions and/or the vertical cut-off lines are deployed.

With a control device of this sort the main headlights of a vehicle can be so set up that vehicles driving in front or oncoming cannot create a glare, or only in a controllable way. The vehicles driving out in front or oncoming are mainly captured by cameras or other sensors that relay the information about the locations of the objects in front of the vehicle whose glare needs to be reduced to the control device. With light distributions with vertical cut-off lines a glare-free area, also referred to as a tunnel, is created by moving the vertical cut-off lines in the area in which the object needing to have its glare reduced is located. With the systems already known the control devices are so programmed that each recognized object has the glare removed, even when the glare is not caused by the headlights, whether it is because the object is too far away or because it is located only in a bordering area of the vehicle's foreground lit by the headlights.

This approach has the disadvantage that also areas have their glare removed and are therefore less lit in which no glare removal is necessary. In this way such objects are perceived and recognized as objects that need glare removed that are only weakly lit by the headlights.

SUMMARY OF THE INVENTION

This invention addressees the basic reasons for the problem, to improve a control device of the kind named, so that the removal of glare from the object is only carried out when this glare removal is actually needed. This invention furthermore addresses the basic reasons for the problem, by proposing a procedure by which only those objects will have glare removed for which glare removal is actually needed to be achieved.

This task is solved by the invention by providing the control device a memory in which the lighting strength of locations in front of the main headlights used for the adjustable light distributions of the main headlights by the control device are stored.

With a control device of this sort a procedure can be carried out that solves the task with regards to the procedure. With regards to the procedure the task is solved in such a way that a saved lighting strength or saved lighting strengths for the main headlights of the location in front of the vehicle where glare needs to be reduced, or the locations in front of the vehicle, are compared with a predetermined lighting strength amount.

By means of a processing medium it can be ascertained from the saved light strengths of the control device provided for by the invention whether in a location in front of the main headlights there is a smaller or larger light strength than a predetermined light strength amount on objects in which the glare is to be reduced, using light distributions installed on the main headlights.

Furthermore exceeding the predetermined lighting strength amount by the light strengths established for the main headlights for the location of the objects in which the glare is to be reduced can result in the light distributions and/or vehicle cut-off lines being unalterable that are installed on the main headlights by means of the processing medium.

On the other hand, exceeding the predetermined lighting strength amount by the light strengths established for the main headlights for the location of the objects can result in the light distributions and/or vehicle cut-off lines that are installed on the main headlights with the goal of reducing lighting strengths for the location of the object in which the glare is to be reduced by means of the processing medium being alterable.

When following a procedure provided for by the invention, exceeding the predetermined lighting strength amount by the light strength or light strengths established for the main headlights for the location of the objects in which the glare is to be reduced can result in the light distributions and for vehicle cut-off lines that are installed on the main headlights by means of the processing medium remaining unalterable. Objects in whose location the lighting strength is so weak that a lighting by the headlights isn't perceived as glare, do not have their glare removed.

On the other hand, exceeding the predetermined lighting strength amount by the light strength or light strengths established for the main headlights for the location of the objects can result in the light distributions and/or vehicle cut-off lines that are installed on the main headlights with the goal of reducing lighting strengths for the location of the object in which the glare is to be reduced by means of the processing medium being alterable. It is thereby assured that glare is removed from objects for which glare removal is needed.

The reduction of the lighting strengths in the location of the objection whose glare is to be reduced can be achieved by a displacement of the cut-off line and/or a dimming of the light distribution or by setting a light distribution similar to a light dimming.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrates the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
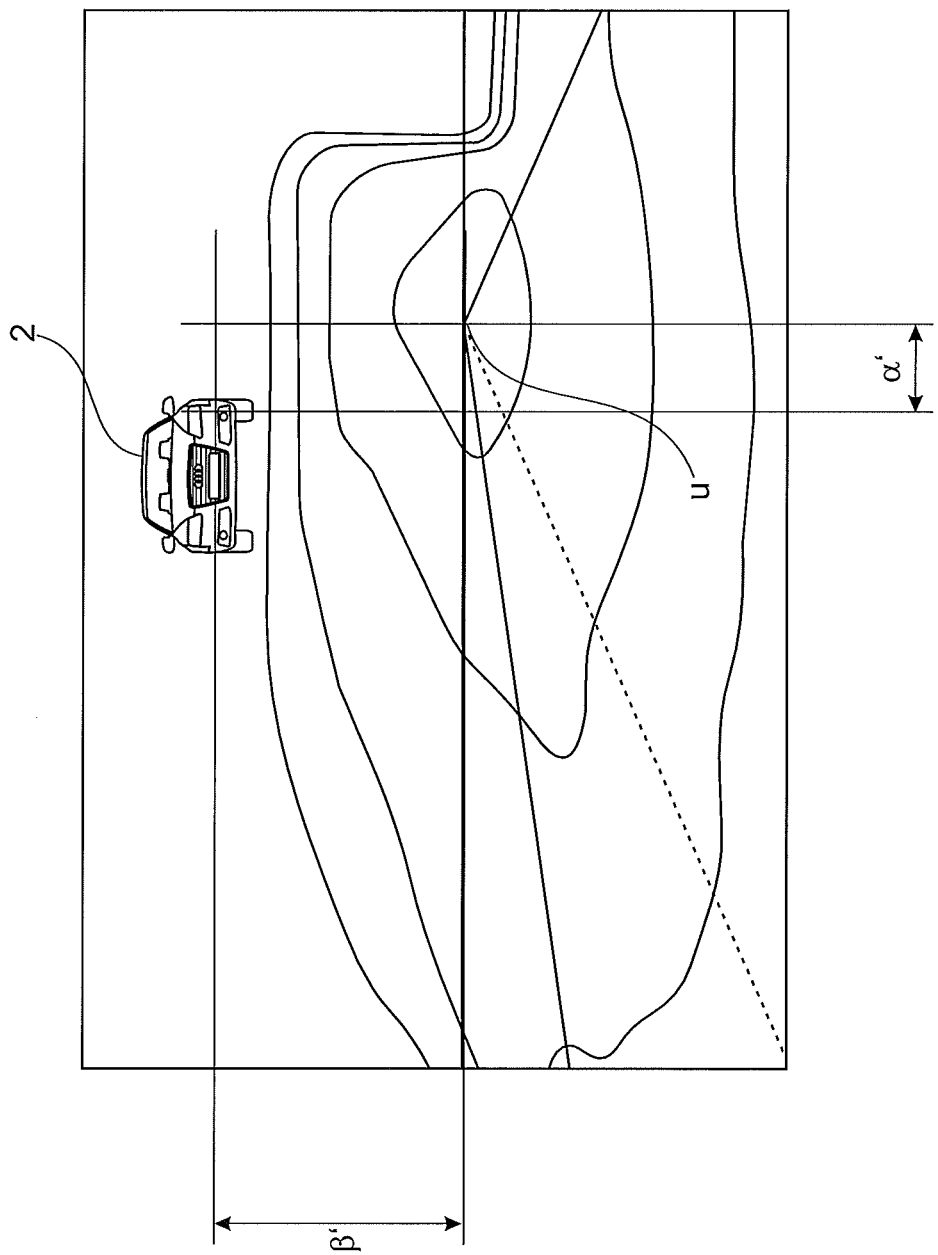
FIG. 1 the light strength distribution in the distance of a second vehicle to a first vehicle and FIG. 2 is a schematic representation of the situation of the first vehicle, the second vehicle, the longitudinal direction of the first vehicle and the lighting strength distribution of the headlights of the first vehicle in the distance of a second vehicle.
Figure 2:
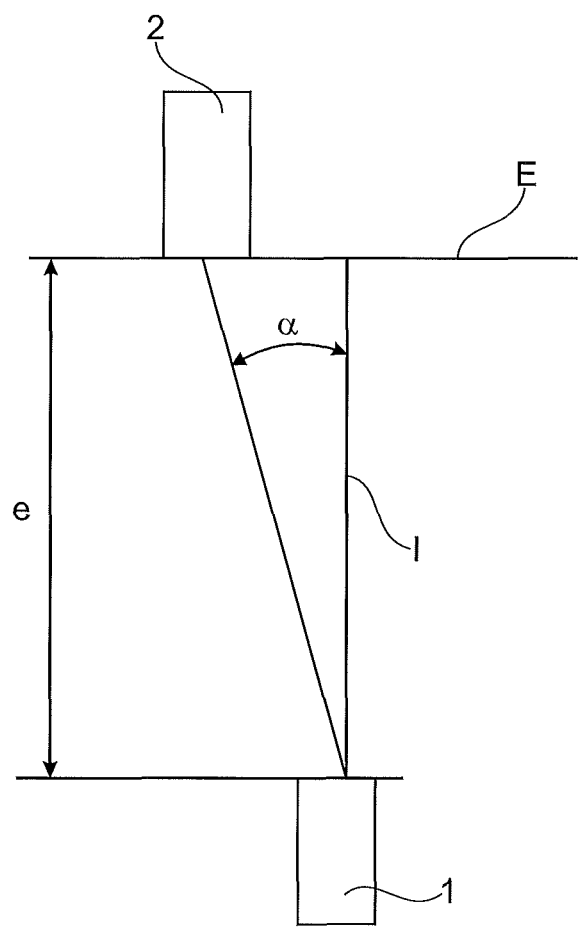

The lighting strengths represented in FIG. 1 reproduce lighting strengths in a Level E perpendicular to Longitudinal Direction 1 of the Vehicle 1. In FIG. 1 different lighting strengths are represented by Isolux lines. Longitudinal Direction 1 of Vehicle 1 cuts the level at Point U. At this Point U the source of a coordination system that can be used to describe the lighting strength distribution of the headlights of the first Vehicle 1 is laid and is shown in FIG. 1.

In FIG. 1 the second Vehicle 2 is also shown, whose driver cannot be blinded by the headlights of the first vehicle. The location of the second Vehicle 2 is described by a face angle α, an angle of the elevation β and a distance e, whereby the face angle α is measured by a perpendicular level that absorbs the Longitudinal Axis 1 and the angle of the elevation β is measured by a horizontal level that absorbs the Longitudinal Axis 1 of the second Vehicle 2. The measurement of the face angle α, the angle of the elevation β and the distance e is known from the state of the art.

Figure 3:
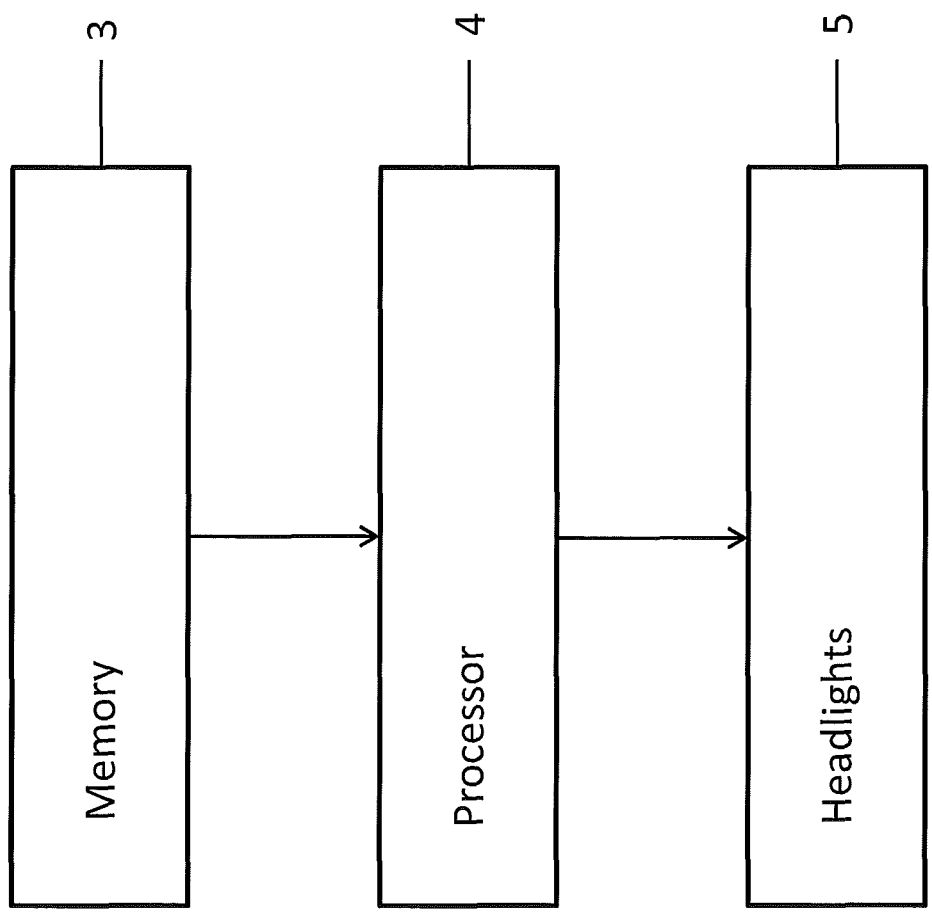
FIG. 3 is a block diagram of the system according to one embodiment.
Figure 4:
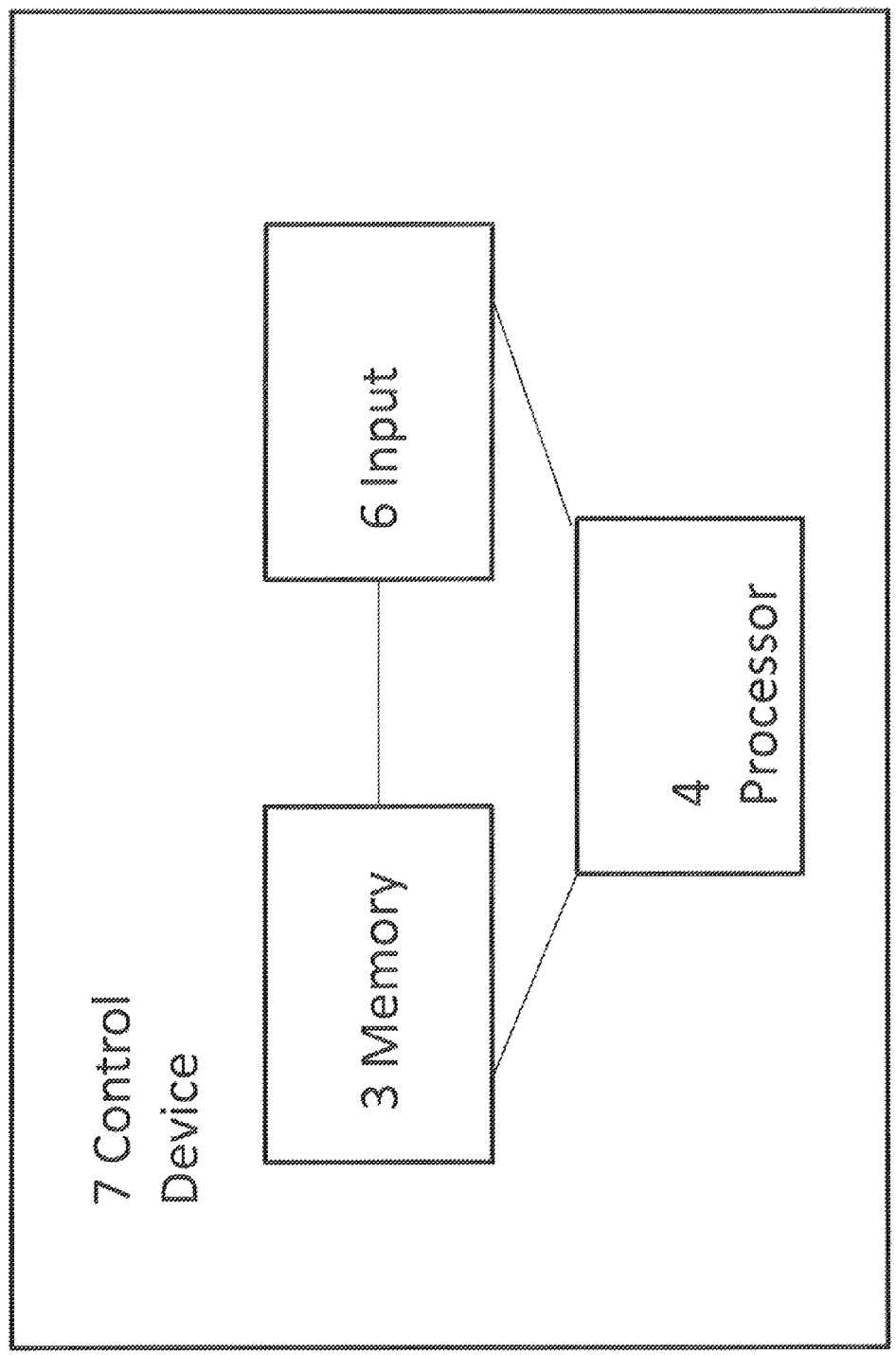
FIG. 4 is a block diagram of the control device according to one embodiment.
Figure 5:
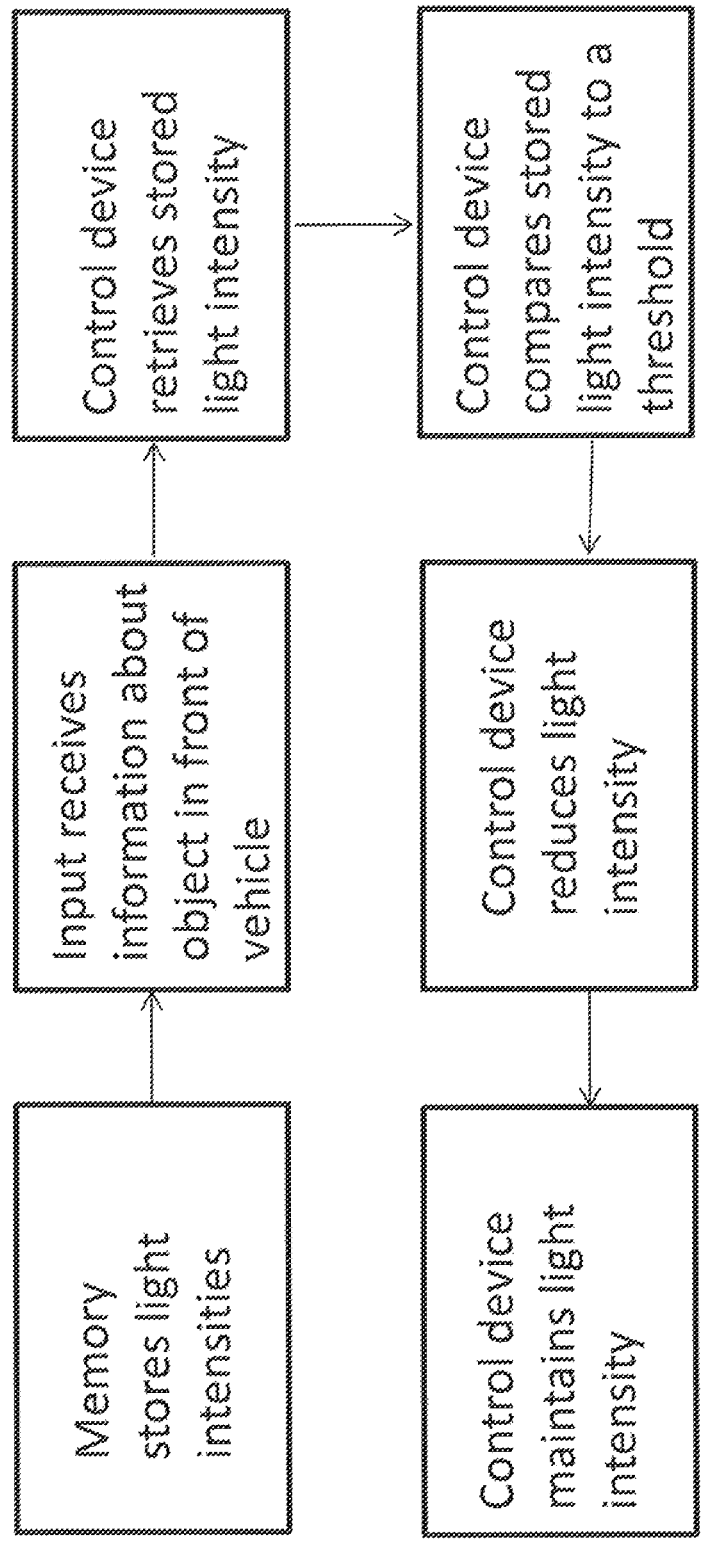
FIG. 5 is a flowchart of a process of the system according to one embodiment.

A control device (illustrated as numeral 7 in FIG. 4) which may include a processor (illustrated as numeral 4 in FIGS. 3 and 4), determines the lighting strength distribution of the distance e of the first vehicle from a memory (illustrated as numeral 3 in FIG. 3). The face angle α and the angle of the elevation β can be converted in Cartesian coordinates α', β' of the coordination system presented in FIG. 1 by means of the control device 7 contained in the invention. Should the Cartesian coordinates of the second Vehicle 2 be known from an input 6, the lighting strengths in the location of the second Vehicle 2 can be read in a simple way from a memory of the control device. Should the lighting strengths, as in the example of FIG. 1, be less than 1 lx, smaller than a specified amount, the driver of the second Vehicle 2 is not blinded. A change of the lighting strengths in the location of the second vehicle is unnecessary and the light distribution installed on the headlights (illustrated as numeral 5 in FIG. 3) of the first vehicle and/or cut-off line can remain unchanged.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE INDICATORS 1 first vehicle
2 second vehicle
l Perpendicular axis of the first vehicle
E Level perpendicular to the perpendicular axis of the first vehicle in the location of the second vehicle
α Face angle between the perpendicular axis of the first vehicle and a beam from the first vehicle to the second vehicle
β Angle of the elevation between the perpendicular axis of the first vehicle and a beam from the first vehicle to the second vehicle
e Distance between the first vehicle and the second vehicle
U Source of the Cartesian coordination system in Level E
α' Cartesian coordinates of the second vehicle in Level E
β' Cartesian coordinates of the second vehicle in Level E

The invention claimed is:

1. A control device for controlling headlights of a vehicle with at least one of an adjustable light distribution and a vertical cutoff line, comprising:
  at least one headlight of a vehicle capable of adopting at least two headlight configurations, each of which generate light intensities at different locations in front of the at least one headlight;

a memory for storing light intensities of said headlight for different locations in front of the headlight and for each headlight configuration;

an input for identifying an object in a location in front of the headlight;

a processor for determining a present headlight configuration for the headlight, and for retrieving the stored light intensity at the identified location for the present headlight configuration; and wherein said processor is operable to reduce the light intensity at the location of the at least one object by instructing the headlights to adopt a different headlight configuration having a lower light intensity at the location of the at least one object when the light intensity at the at least one object is determined to be above a threshold, and wherein the headlight adopts the different headlight configuration; and wherein said processor is operable to maintain the light intensity at the location of the at least one object when the light intensity at the at least one object is determined to be below the threshold.

2. The control device according to claim 1, wherein said processor is operable to reduce the light intensity at the location of the at least one object when the light intensity at the at least one object is determined to be above the threshold by adjusting at least one of a light distribution and a vertical cut-off line.

3. A process of controlling the headlights of a vehicle with at least one of an adjustable light distribution and a vertical cut-off line, comprising the steps of:

storing light intensities for different locations in front of said headlights and for different headlight configurations;

identifying an object in a location in front of the headlights;

determining a present headlight configuration;

retrieving the stored light intensity of that location for the present headlight configuration;

comparing the retrieved light intensity to a threshold to determine whether the present headlight configuration needs to change; and instructing the headlights to adopt a different headlight configuration having a lower light intensity at the location of the at least one object when the light intensity at the at least one object is determined to be above the threshold by adjusting at least one of a light distribution and a vertical cut-off line.

4. The process of controlling headlights of a vehicle according to claim 3, further comprising maintaining the light intensity at the location of the at least one object when the light intensity at the at least one object is determined to be below a threshold.

5. A process of controlling the headlights of a vehicle with at least one of an adjustable light distribution and a vertical cut-off line, comprising the steps of:

storing light intensities of said headlights for different locations in front of the headlights and for different headlight configurations;

identifying an object in a location in front of the headlights;

determining a present headlight configuration;

retrieving the stored light intensity of that location for the present headlight configuration;

comparing said retrieved light intensity to a threshold to determine whether the present headlight configuration needs to change; and instructing the headlights to adopt a different headlight configuration having a lower light intensity at the location of the at least one object when the light intensity at the at least one object is determined to be above the threshold by adjusting at least one of a light distribution and a vertical cut-off line.

\* \* \* \* \*

UNITED STATES PATENT AND TRADEMARK OFFICE
CERTIFICATE OF CORRECTION

PATENT NO. : 9,610,889 B2  
APPLICATION NO. : 13/683407  
DATED : April 4, 2017  
INVENTOR(S) : Christian Schmidt et al.

Page 1 of 1

It is certified that error appears in the above-identified patent and that said Letters Patent is hereby corrected as shown below:

In the Specification

In Column 2, Lines 64-65, delete "distributions and for vehicle" and replace with -- distributions and/or vehicle --

Signed and Sealed this  
Ninth Day of May, 2017

Michelle K. Lee  
*Director of the United States Patent and Trademark Office*